F. D. WERNER ET AL 3,099,160

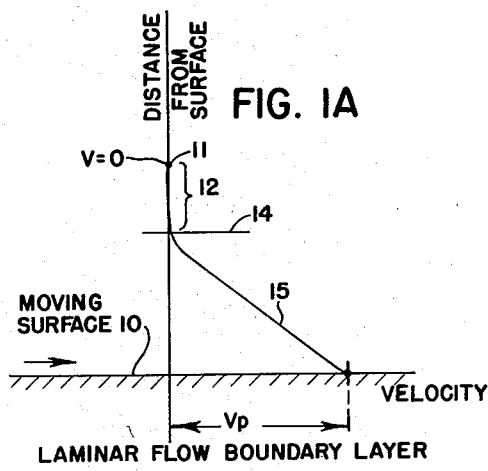
FIG. 1A — LAMINAR FLOW BOUNDARY LAYER
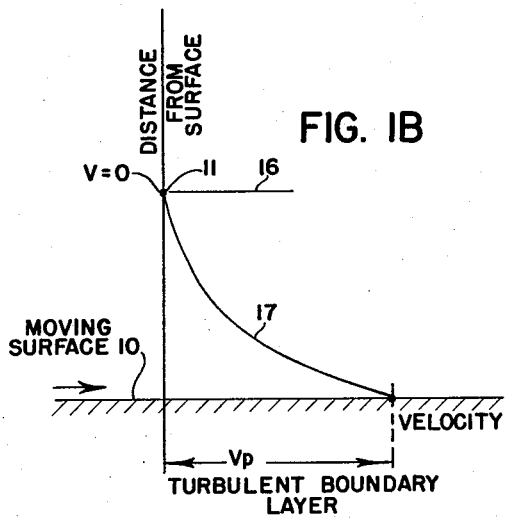
FIG. 1B — TURBULENT BOUNDARY LAYER
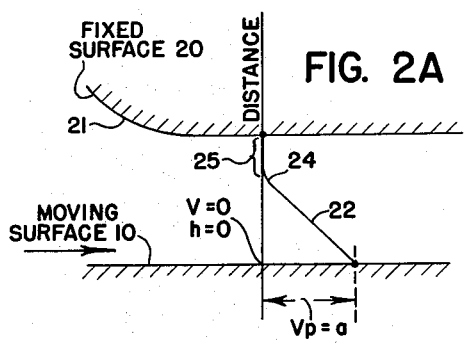
FIG. 2A
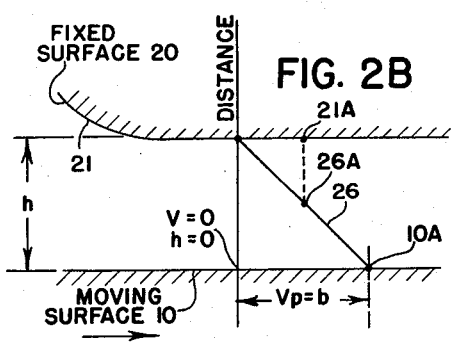
FIG. 2B
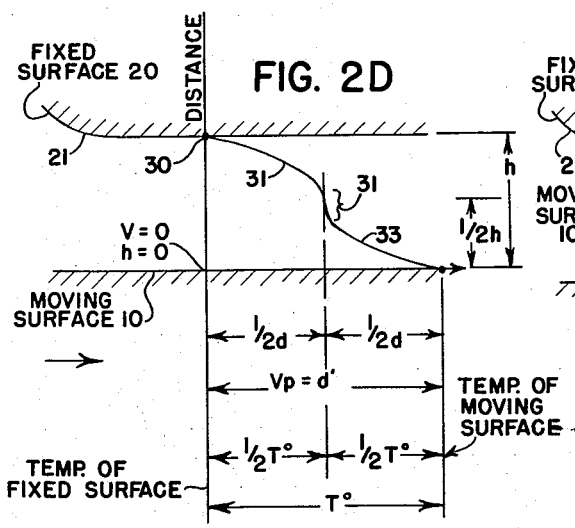
FIG. 2D
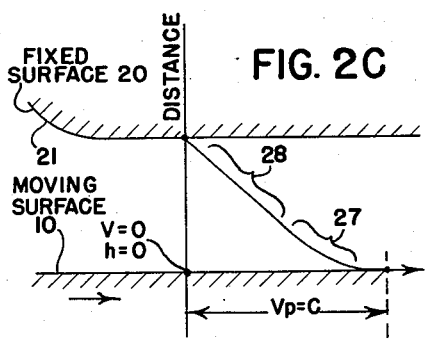
FIG. 2C
INVENTORS
FRANK D. WERNER
RICHARD V. De LEO

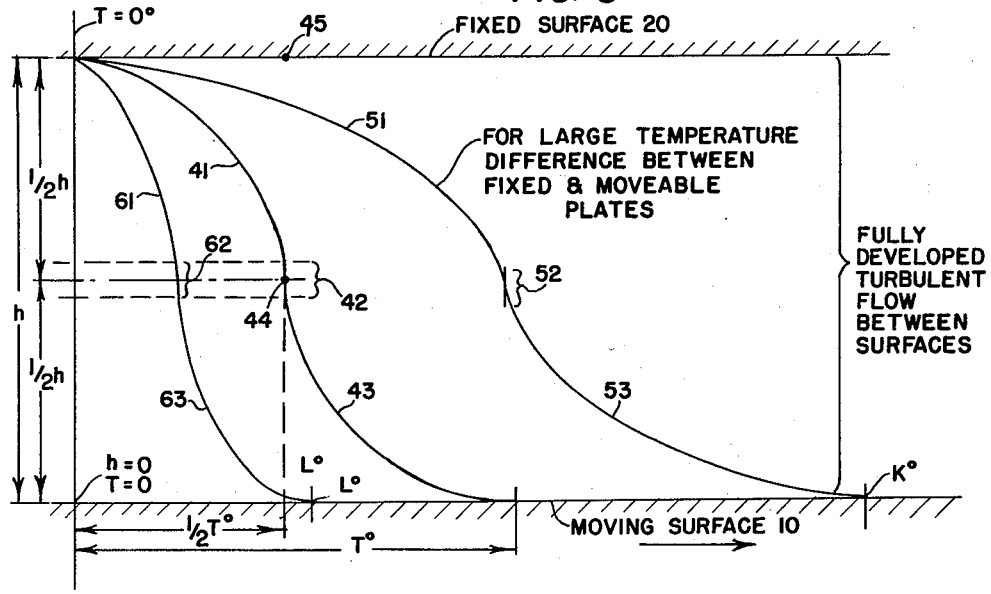
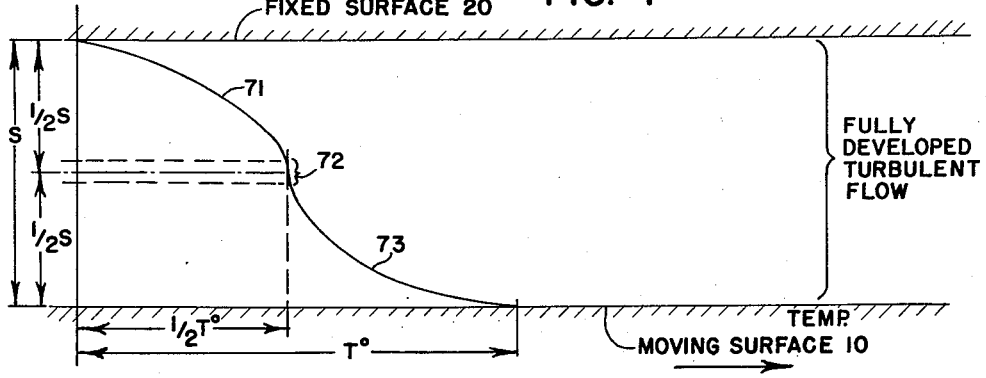
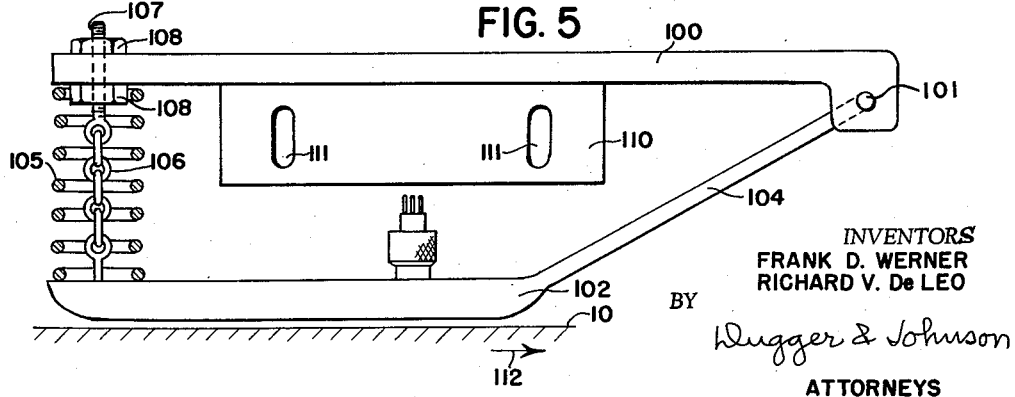
INVENTORS
FRANK D. WERNER
RICHARD V. De LEO
BY
Dugger & Johnson
ATTORNEYS July 30, 1963

MOVING SURFACE TEMPERATURE SENSOR

Filed Nov. 3, 1961

INVENTORS
FRANK D. WERNER
RICHARD V. De LEO

BY

Dugger & Johnson

ATTORNEYS

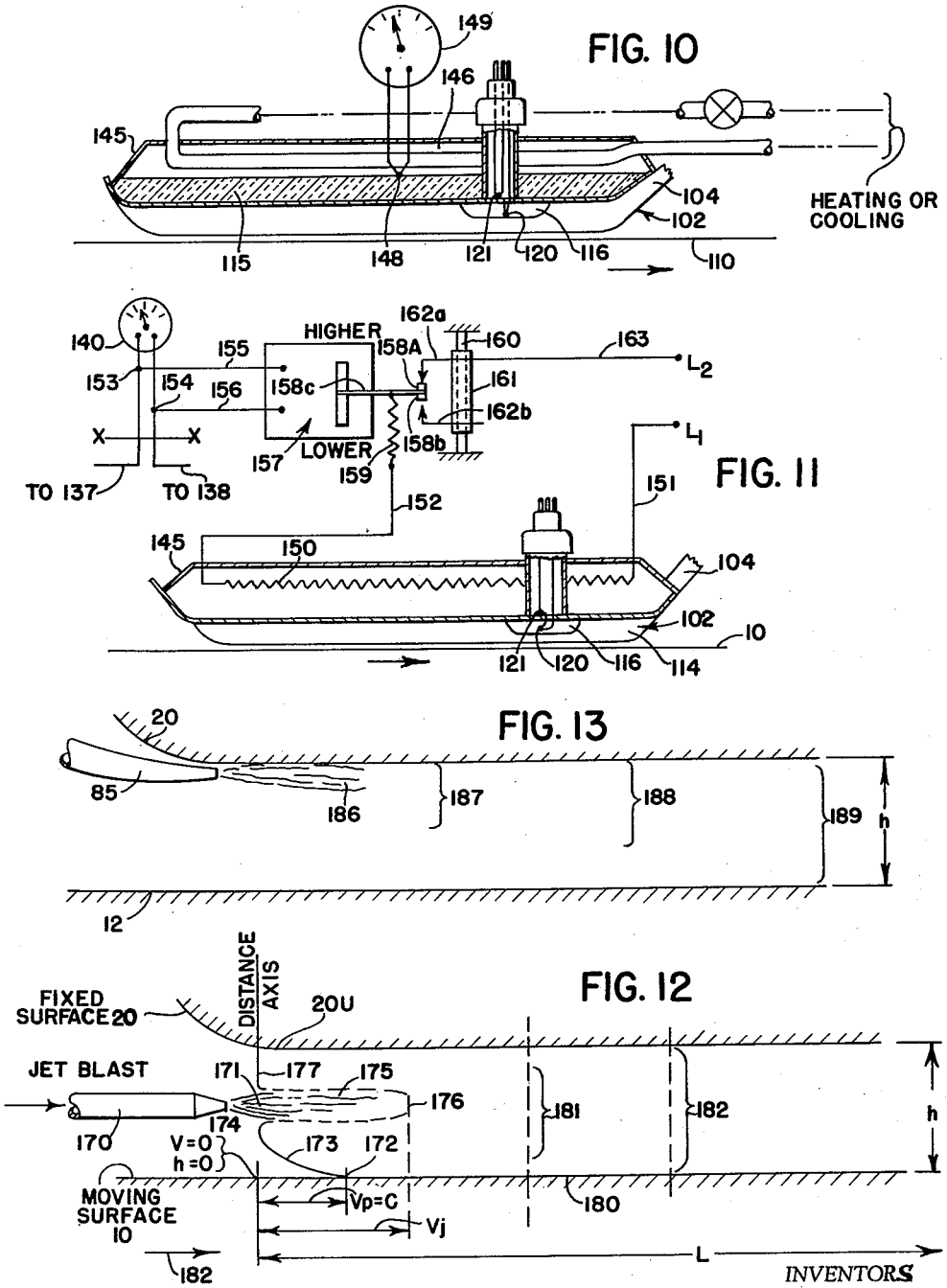

United States Patent Office 3,099,160
Patented July 30, 1963

3,099,160
MOVING SURFACE TEMPERATURE SENSOR
Frank D. Werner, Minneapolis, and Richard V. De Leo, Hopkins, Minn., assignors to Rosemount Engineering Company, Minneapolis, Minn., a corporation of Minnesota
Filed Nov. 3, 1961, Ser. No. 150,620
14 Claims. (Cl. 73—342)

This invention relates to devices for determining, within reasonably accurate limits, the temperature of a moving surface. There are many situations in industry where it is desirable to determine the temperature of a moving surface whether it be a device or a product. For example, in the metal working arts, it is frequently desirable to determine the temperature of a strip or sheet of metal which is undergoing treatment such as plating, annealing, rolling or finishing. In other situations, as during the fabrication of plastic or woven sheets and films, temperatures may be desired to be controlled and for this purpose the temperature of the moving sheet needs to be determined.

It is an object of the present invention to provide method and apparatus for measuring the temperature of a moving surface such as a strip or wall of a surface of revolution. It is a further object of the invention to provide a simple device which may be used with a moving strip or sheet of material, or adjacent a moving surface such as a pulley, or adjacent a moving sheet or strand which is carried along a prescribed path for the purpose of determining the temperature of such strip, strand or surface. It is another object of the invention to provide a rugged easily installed and reliable temperature measuring device for determining the temperatures of surfaces that are moving.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein:

FIGURES 1A and 1B are related views, each of which combine a longitudinal section through a moving surface taken in the direction of movement of the moving surface and a graph illustrating the condition of flow in the gaseous fluid adjacent such moving surface.

FIGURES 2A, 2B, 2C and 2D are a related series of views, each of which combines a longitudinal sectional view through adjacent fixed and moving surfaces taken in the direction of movement of the moving surface and including a graph illustrating the condition of gaseous fluid flow between the surfaces. These views are similar and show the gaseous fluid velocities for different velocities of the moving surface. In respect to FIGURE 2D, this figure shows the velocity conditions and also the temperature conditions in the flow between the fixed and moving surfaces.

FIGURE 3 is an enlarged view similar to FIGURE 2D and is a longitudinal section through fixed and moving surfaces taken along the direction of movement of the moving surface and illustrating further the temperature condition in the gaseous fluid between the moving surface and the fixed surface when a turbulent condition of gaseous fluid exists between the two surfaces. This figure illustrates the conditions for three temperature differences between the two surfaces.

FIGURE 4 is a graph similar to FIGURE 3 and illustrates a moving surface and a fixed surface and the conditions in the gaseous fluid when the gaseous fluid is in a fully developed turbulent condition and there is a differential temperature T° between the surfaces, and the distance between the surfaces is decreased as compared to that shown in FIGURE 3.

FIGURES 5 through 9 illustrate one illustrative embodiment of the invention, FIGURE 5 being a side elevational view of the sensor and mounting, FIGURE 6 being an enlarged side elevational view of the sensor portion of the device shown in FIGURE 5, FIGURE 7 being a transverse sectional view taken along the line and in the direction of the arrow 7—7 of FIGURE 6 and FIGURE 8 being a bottom view taken along the line and in the direction of arrows 8—8 of FIGURE 6. FIGURE 9 is a wiring diagram of the device shown in FIGURES 5-8.

FIGURE 10 is a schematic view in cross section, illustrating a slightly modified form of the invention. FIGURE 11 is a schematic side view showing another modified form of the invention. FIGURE 12 is a schematic longitudinal sectional view showing still another modified form of the invention. FIGURE 13 is a longitudinal sectional view showing yet another modified form of the invention.

Throughout the drawings, corresponding numerals refer to the same elements.

Figure 6:
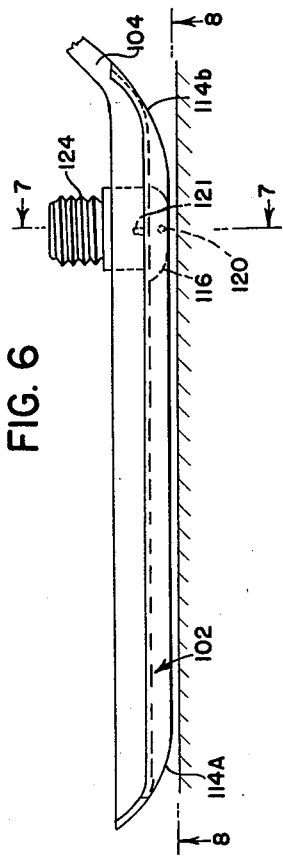
Figure 8:
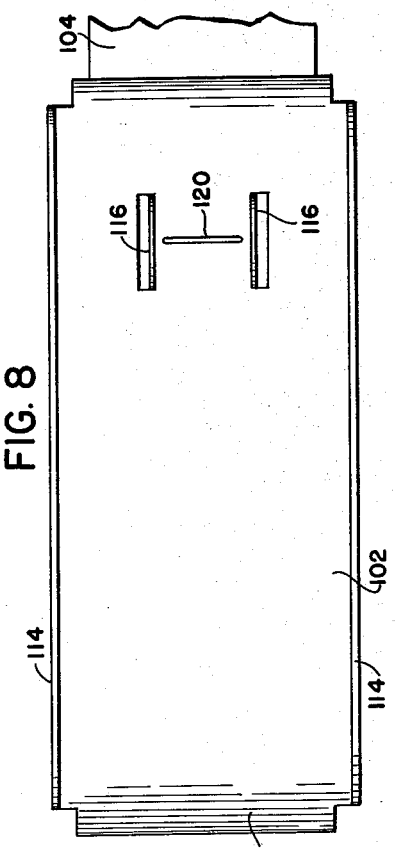
Figure 7:
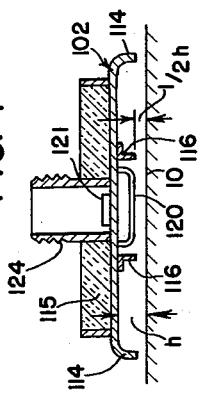

Referring to FIGURES 1A and 1B, in these figures there are shown essentially sectional longitudinal views through a moving surface, taken in the direction of movement of the surface. These views also illustrate the conditions of the gaseous fluid adjacent the moving surface. In both FIGURES 1A and 1B (as in all other views except FIGURES 14–16), the moving surface 10 is considered to be moving to the right as shown by the arrow. The line designated "distance from the surface" is a graphical coordinate and represents zero velocity, with velocity increasing to the right. At a position 11 in space, adjacent the surface 10, a particle of gaseous fluid, such as air has a zero velocity. It is assumed in FIGURE 1A that the surface 10 moves at a constant slow velocity Vp to the right. The velocity Vp is slow enough that turbulence is not induced. Under these velocity conditions, the velocity of the gaseous fluid at various positions between the position of the point 0 and the moving surface 10 may be determined, and it will be found that the velocity of the gaseous fluid is zero at the point 11, i.e. "still" conditions, and such "zero" velocity, "still" conditions, prevails for a certain distance in the direction of the moving surface, represented by the bracket 12. In other words, for low velocities of movement of surface 10, the movement of the surface does not affect the gaseous fluid beyond a position such as represented by the line 14, and between the line 14 and the moving surface, the velocity in the gaseous fluid increases in the direction of the moving surface, the increase being essentially a straight function like line 15. Under these conditions the gas in this region 15 is considered as having what is known as "laminar flow." The gas between the line 14 and the moving surface 10 is called the "boundary layer" and as long as the velocity Vp is low enough so as not to induce turbulence, the boundary layer will have the same velocity as the moving surface 10 at such surface, and the velocity will gradually decrease along a straight line function, to some position 14, beyond which the boundary layer has no effect. Outwardly beyond position of line 14 as to be noted by the bracket 12, the moving surface has no effect upon the gaseous fluid.

However, if, due to a greater velocity of the moving surface such as Vp of FIGURE 1B or if, due to any other cause, the gaseous fluid between the position of particle 11 at line 16 and the moving surface is set into a condition of turbulence, then the velocity measured at varying distances from the moving surface 10 will follow a curve such as curve 17.

FIGURES 2A through 2D are a related series, and further illustrate the conditions which exist in a gaseous fluid as the velocity of the moving surface is increased, with resultant increase in turbulence, or where, due to any other reason, turbulence is induced between the fixed and moving surfaces. In all of these figures, the moving surface is denoted 10 and a fixed surface 20 is placed at a distance "h," substantially parallel to the moving surface. The moving surface in these figures is considered as moving to the right as denoted by the arrows, and the "upstream" edge of the moving surfaces is provided with an entrance curve as at 21, so as to provide a smooth mouth into the space "h" between the moving surface 10 and the fixed surface 20. These figures may be considered as illustrating the invention and are longitudinal sections between the two surfaces, namely a sensor surface (fixed) and a moving surface. Upon each of these figures, there is superimposed a graphical coordinate labeled "distance" which represents the distance from the moving surface. The intersection of this coordinate with the moving surface represents a condition of V=0.

Referring to FIGURE 2A, if the velocity of the moving surface Vp is considered as being a low velocity "a" such as will not induce turbulence, the condition prevailing between the moving surface 10 and fixed surface 20 will be very much as illustrated in FIGURE 1A; that is to say at the moving 10 the velocity of the air or gaseous fluid between the surfaces will be Vp and at increasing distances away from the moving surface the velocity decreases along a line 22 (like at 12 in FIGURE 1A), which is substantially a straight line function until intersecting the zero velocity line at about 24, and from this point the velocity is zero over to the fixed plate 20; that is to say opposite the bracket 25, the gas between the plates is substantially undisturbed. This condition prevails when the moving surface 10 is moving very low velocity "a" and due to the low velocity, a condition of "laminar flow" is established throughout that portion of the distance "h" between the two surfaces which is between 24 and surface 10.

Referring to FIGURE 2B, as the velocity of the moving surface is increased to an amount "b" the laminar flow condition will then reach all the way across the distance "h" between the two surfaces 10 and 20, but being laminar in condition, the velocity at any position between the two plates decreases by way of a substantially straight line function, as at line 26.

Referring to FIGURE 2C, as the velocity Vp of the moving surface 10 increases to an amount "c," a condition of turbulence is induced in that portion of the layer which is adjacent the moving surface. Thus, changing the curve of velocities so that it includes a curved portion 27 (which is not a straight line), but remaining portion 28 of the velocity curve of the gasses between the two plates 10 and 20 will be substantially straight lined, as at 28.

Referring to FIGURE 2D, it will be assumed that the velocity Vp of the moving surface 10 is substantially increased to an amount "d," thereby inducing a condition of complete turbulence between the two surfaces 10 and 20, or even though the velocity Vp may not be substantially increased, the turbulence is induced in the gaseous flow between the plates, by using a jet or mechanical stirring, or due to some other reason.

According to the present invention, it has been discovered that when the gaseous fluid has a "Prandtl number" of one or approximately one, and that when there is a condition of fully developed laminar flow or fully developed turbulent flow between the moving surface 10 and fixed surface 20, then the temperature of the fixed surface and the temperature at a selected point in such fully developed flow will bear a functional relationship to the temperature of the moving surface.

For purposes of this invention the term "fully developed gaseous fluid flow" is intended to include both the fully developed laminar flow conditions and the fully developed turbulent flow conditions, and will be so understood. The term "Prandtl number" is defined by the equation:

$$\text{Prandtl number} - Pr = Cp\frac{u}{k}$$

where $Cp$ = specific heat at constant pressure
$u$ = velocity
$k$ = thermal conductivity The invention is therefore applicable in those situations where the fluid has a Prandtl number of one or substantially one and where a fully developed laminar flow condition or a fully developed turbulent flow condition exists.

In FIGURE 2B there is illustrated a fully developed laminar flow. FIGURES 2D, 3 and 4 illustrate a fully developed turbulent flow. In either type of flow condition, two temperature readings are taken at the stationary surface and at a position between the stationary and moving surfaces.

According to this invention it has been found that in the laminar flow conditions of FIGURE 2B, the change in temperature from the stationary to the fixed surfaces follow a substantially straight line function just like the velocity functions of the gaseous flow. Hence, it is only necessary to measure the temperature at a point 21A on the fixed plate and at a point 26A on the line 26 and measure the distance from the surface 20 to the same point 26A and then the temperature at point 10A can be calculated by simple proportion.

When there is a condition of fully developed turbulence between the fixed surface 20 and moving surface 10, as will occur when surface 10 moves rapidly and the space between the surfaces is sufficiently long so that the turbulence can develop fully, or where turbulence is purposely induced, then, under such fully developed turbulent conditions the velocity curve and temperature curve are as shown in FIGURE 2D (also FIGURES 3 and 4). In such condition of fully developed turbulence the velocity of the gaseous fluid (having a Prandtl number of one or approximately one) will be zero velocity righ at the fixed surface, as at point 30 and gradually increase along a curved line function as at 31, but remains substantially constant for a short distance opposite the bracket 32, at a position substantially midway between the two surfaces, and thereafter continues along another curve 33, which is identical with the curve 31, but shaped in the opposite direction, and reaches the full velocity "d" at the point 34. It has been discovered that under these condtions of complete turbulence between the stationary and moving plates, that the temperature curve, as measured across the distance between the two plates, will also faithfully follow the velocity curve, and that especially at the center portion 32, approximately mid-way between the two plates, there is a segment of the curve shown opposite bracket 31 which is more or almost normal to the moving surface 10, wherein the temperature changes very little and is substantially one-half the temperature difference between the two plates 10 and 20. Thus, if the temperature of the moving surface is considered as zero degrees and the temperature of the fixed surface is considered as temperature T, then the temperature at a point throughout the whole region 31, which is a small short space at the middle between the two surfaces, this temperature will be one-half T. This is a significant and useful discovery.

Referring to FIGURES 3 and 4, these graphs illustrate further the temperature conditions existing between fixed and moving surfaces when, according to the invention, a completely homogenously turbulent condition of flow exists in the gaseous fluid between the surfaces. In both FIGURES 3 and 4, as in the previous figure, the lower surface 10 is the moving surface 10, and it is assumed in these figures to be moving toward the right as shown by the arrows. The fixed surface is the upper surface 20. These surfaces are positioned at a distance "$h$" between them, and it is assumed that a fully developed turbulent flow exists between the two surfaces. Under these conditions, the temperature conditions between the two plates may be plotted. The temperature coordinate is made to coincide wtih the surface of the moving surface 10, and increases from $T=0°$ at the left in FIGURE 3 and increases to the right. The distance coordinate is normal to the moving surface 10 and increases from zero distance at the moving surface to "$h$" at the stationary surface. The two surfaces are shown as spaced at a distance "$h$" between each other. Thus, in FIGURE 3, where the temperature of the moving surface is $T°$, and the temperature of the fixed surface is zero degrees, then, assuming that a Prandtl number of one or approximately one, and assuming a fully developed turbulent flow between the two surfaces, the temperature will gradually increase (from the fixed surface) along a curve 41, and pass through a portion shown opposite the bracket 42, in which the temperature remains substantially constant for this short distance and then continues along another portion of the curve 43. Portion 43 is precisely similar in shape to the portion of 41, except that it is oriented to the right instead of to the left. Curve 43 intersects the moving surface 10. Accordingly, in order to measure the temperature of a moving surface, it is only necessary to provide a temperature sensor at a distance which is along curve 41–43 and calculate the total temperature T from the curve. However, because the curve 41—42—43 does include a substantially constant temperature at the half-way zone 42, we prefer to locate the temperature sensor one-half the distance "$h$" between the two surfaces. Thus, the sensor would be placed preferably at one-half the distance "$h$," at the point of 44, but it could, without substantial error, be any place within the region denoted by the bracket 42. By sensing the temperature at the point 44 (or in the region 42), and also sensing the temperature of the fixed surface 20 as at the point 45, there is then provided a temperature differential reading which, when multiplied by two, will give the total temperature difference between the fixed surface 20 and the moving surface 10, and thus without ever contacting the moving surface it is possible accurately to obtain a temperature indication of the moving surface.

When gaseous flow is the same and the temperature differential T between the moving surface 10 and the fixed surface 20 increased to, for example $K°$, the shape of the curve of temperatures in the fully developed turbulent flow between the surfaces 10 and 20 will be similar to the curve 41—42—43. That is to say there will be a curve portion 51, which joins a portion 52 (in which the temperature is substantially constant) and then another portion of the curve at 53 which is similar but oppositely directed to the portion 51 and intersects the surface 10 at the point at $K°$. Similarly, if the temperature differential between the two plates is reduced to an amount $L°$, the shape of the curve 10 is also similar, and has a portion 61 which is curved and connects through a portion opposite the bracket 62 wherein the temperature remains substantially constant for a short distance and then proceeds through a portion 63 which is similar to the portion 61 but is directed in the opposite direction, and it intersects the moving surface at the point $T=TL°$.

Accordingly, the same function prevails regardless of the amount of the temperature differential between the moving surface 10 and the fixed surface 20, so long as the gaseous fluid is a fully developed turbulent flow in a fluid having a Prandtl number of substantially one. By locating a temperature sensor at approximately the midpoint (i.e. in the zones 42, 52 or 62) and by sensing the temperature in this region and simultaneously sensing the temperature on the fixed surface, then by multiplying the temperature differential by two, there may be determined the total temperature differential between the fixed and moving surfaces.

It has been discovered that when the distance between the fixed and moving surfaces is changed the same function will occur. Thus, in FIGURE 4, the temperature differential between the moving surface 10 and the fixed surface 20 is maintained at $T°$ degrees, the same as for curve 41—42—43 of FIGURE 3, but in this instance, the distance between the two surfaces is decreased to S. The shape of the curve of temperatures which exists in the fully developed turbulent flow between the surfaces is similar to those shown in FIGURE 3 and has a portion 71 wherein the temperature changes at a decreasing rate which joins a portion at region 72, wherein the temperature remains substantially constant in a short zone, and thence continues through the portion 73 wherein the temperature increases at a gradually increasing rate in the direction of the moving surface 10. The curve 71—72—73 is thus similar to the curve shown in FIGURE 3, and the same discovery is found to prevail.

Therefore, in general, in utilizing this invention, the moving surface (the temperature of which is to be measured) is arranged to move near a stationary surface under conditions such that the gaseous fluid between the surfaces will have opportunity to become a fully developed flow (laminar or turbulent) in the space between the fixed and moving surfaces. Provision is then made to read the temperatures at the fixed surface and at a position located between the fixed and moving surfaces. This latter position can be selected at any place between the surfaces and, by use of the appropriate graph for the type of flow, the temperature of the moving surface can be extrapolated with useful accuracy. For convenience and accuracy, we prefer to place the inter-surface sensor at the one-half way point between the fixed and moving sensors. When this is done, it makes no difference whether the flow is a fully developed laminar flow or a fully developed turbulent flow since the temperature difference between the sensor on the fixed surface and the sensor on the space between the surfaces then need only be multiplied by two. Also, the same arrangement can be used for both fully developed flows, i.e. "laminar" and "turbulent". In most situations we prefer to utilize a condition of fully developed turbulent flow.

In utilizing the discoveries of this invention there may be provided any one of a variety of devices, of which an exemplary form is shown in FIGURES 5–9. In FIGURE 5 the moving surface 10 may be considered, for example, as a sheet of metal or any other material or a surface, the temperature of which is desired to be measured. Adjacent this moving surface there is provided a bracket 100 that is mounted in any convenient way. Here, the bracket is shown as provided with a pivot 101 on which a sensor shoe 102 (which is the fixed surface) is pivotally mounted at the end of the arm 104. The shoe and arm are integral and form a stiff unit, and they are held in spaced relation to the mounting frame 10 by means of a spring 105 which presses the shoe 102 and the mounting frame 100 apart. These are maintained in a fixed distance apart by means of a spring 106 which is attached by means of an adjusting screw 107 held in place by nuts 108—108. The bracket 100 is provided with a mounting flange 110 having holes 111 therein by means of which it is mounted in a stationary manner adjacent the moving surface 10, the temperature of which is desired to be measured. The mounting is adjusted so that the portion 102 of the sensor frame is generally parallel and at a desired small distance "$h$" from the moving surface. In FIGURE 5 the moving surface 10 is considered as moving in the direction of the arrow 112. The sensor mount 102 consists of a channel shaped member, generally designated 102 having downwardly extending side flanges 114—114 which are parallel to the direction of motion of the moving surface 10. These flanges reach in a direction towards the moving surface, and they are rounded off at the ends 114a and 114b. The mount 102 is essentially an open bottom channel which has side walls extending toward the moving surface 10. On the back of the channel there is provided a walled recess 115, which is preferably filled with insulation 116, so as to decrease the likelihood of changes of temperature of the mount. Within the channel, and on its underside which faces the surface 10 there are provided two small guards 116—116 which are at a position adjacent the downstream end 114b of the channel. These guards reach down from the undersurface of the channel 102 to a little below the midpoint between the under surface and the moving surface 10. These guards are rounded off at each end as shown in FIGURE 6. Within the guards 116, there is provided a sensor 120 which is preferably of the resistance-wire type, and the resistance wire may be placed in a very small guard tube for mechanical protection. This sensor is positioned so that it will be located at a distance which is one-half the distance "$h$" between the underside of the channel 102 and the surface. This is in accordance with the discovery which is hereinbefore described with reference to FIGURES 2D, 3 and 4. By adjusting the screw 107 (see FIGURE 5), the position of the sensor 120 may be accurately controlled, although it should be remembered that extreme accuracy is not required, because as shown above, the position 10 be any place within the range 42, 52, 62, 72 (see FIGURES 3 and 4) without seriously affecting the accuracy of the resultant temperature reading. In addition, another temperature sensor is placed at 121 on (or in) the mounting plate 102. This sensor is preferably placed on plate 102 at a position reasonably proximate sensor 120 and within a well formed by the connector 124. The insulation filling 116 within the space 115 assures that the temperature sensed by temperature 121 will be truly the temperature of the "fixed surface" which in this case is the channel 102.

Accordingly, by sensing the temperature of the fixed surface (which is flat surface of the channel 102), and sensing the temperature at a position approximately one-half way between this surface and the moving surface 10, it is possible, as previously explained herein, to determine the temperature of the moving surface.

Figure 9:
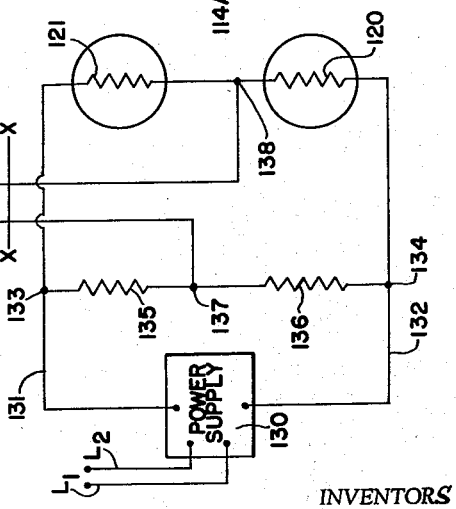

FIGURE 9 illustrates a circuit diagram for utilizing the signals produced by the sensors 120 and 121. A power supply L1—L2 or any suitable power source, is connected to power pack 130 which is of conventional design. From the power pack, the lines 131 and 132 extend respectively to junctions 133 and 134 of a bridge circuit and thence through resistors 135 and 136 to junction 137. From junction 133 a circuit also extends via sensor 121 and thence through junction 138 and sensor 120 to junction 134. The output of the bridge circuit is between junctions 137 and 138 and may be read by any convenient indicator instrument or system. In FIGURE 9 the indicator is illustrated at 140 and consists of a precision millivoltmeter. When the temperature of the moving surface above and below the temperature of the fixed surface, the meter 140 can have a zero adjustment at mid scale. As the temperature of the moving surface varies from that of the fixed surface, the values of sensor resistors 120 and 121 will change, and will produce a signal voltage between the terminals 137 and 138, which is indicated at indicator 140. If the moving surface 10 should have a temperature above or below the temperature of the fixed surface, the indicator 140 will swing one way or another from its zero voltage at mid position on the scale. The scale can be calibrated so as to read in degrees temperature, and should be calibrated to double the amount, which exists actually between the temperature at sensor 120 and the temperature at sensor 121. This double amount will be the temperature difference between the temperature of the fixed surface, i.e. the mounting 102, and the moving surface 10.

By decreasing the amount of temperature differential between the fixed and moving surfaces, accuracy can be increased. Two ways of controlling the temperature of the fixed surface 102 so as to make it have a temperature like or near that of the moving surface are illustrated in FIGURES 10 and 11.

Referring to FIGURE 10, the construction is the same as previously described with reference to FIGURES 5–9 except that above the insulation 116 there is provided an enclosure 145, through which a heat transfer pipe 146 passes. Also within this space there is provided a temperature sensor 148 which is connected to a simple indicator 149, for measuring the temperature within the enclosure 145. The heat transfer pipe 146 can be supplied with a heating or cooling fluid and thus the temperature within the space 145 may be raised or lowered. Thus, the space can be gradually heated to for example, the temperature of the moving surface 10 and in this way the temperature at the underside of the mounting 102, as indicated by the sensor 121 can be brought to a temperature very close to the temperature of the moving surface 10. Therefore, the difference between the temperature of the fixed surface and the temperature of the moving surface 10 may be decreased, and this accordingly increases the accuracy of the system.

In FIGURE 11 a similar system is provided except that under the enclosure 145 there is provided an electrical resistance heater 150 which is connected to lines 151 and 152. Line 151 is connected to power supply L1. The indicator 140 (see FIGURE 9) is provided with parallel junctions 153 and 154 to which lines 155 and 156 are connected, leading to a temperature recorder generally designated 157. This is a standard recorder, except that the marking 10 is provided with a pair of contacts 158a and 158b, which are carried by a stem 158c that is insulated in respect to the recorder mechanism. The stem 158c is connected by a highly flexible lead 159 to line 152. Supported upon a stationary gib 160 is an insulated slider 161 carrying a pair of contacts 162a and 162b which cooperate respectively with the contacts 158a and 158b. From contact 162a line 163 extends to power supply L2. As the indicator instrument 140 indicates an increasing temperature, which is the temperature between the moving surface and the stationary surface, as illustrated in FIGURES 5–9, the recorder 157 will move the stem 158c in an upward direction toward the designation "higher" which means the height of temperatures, and in so doing the contact 158a will engage the contact 162a and will move the insulated rider along the stem 160. In so doing, the circuit is completed from line L1 via line 151 through the resistance heater 150 and thence via line 152 connected to line 159, stem 158b, contacts 158a and 162a to line 163 to supply L2. In this way, heater 150 is energized and heats the space under the cover 145, thereby gradually raising the temperature of the entire mounting 102, and accordingly raising the temperature at sensor 121, thereby decreasing the temperature between the sensor and the moving surface 10. This is to insure that the differential temperature between the moving surface and the stationary surfaces will not become excessive. When the moving surface temperature decreases, the contact 158b will move against contact 162 thereby breaking the circuit through the heater 150, but contact 152b, being unconnected to anything, will merely serve as a means for mechanically moving the insulated rider 161 down on the stem 160, toward the "lower" temperature condition, thereby permitting the entire mounting 102 to reach a decreased temperature. In this way the mounting 102 will, from the standpoint of temperature, follow variations of temperature in the moving surface 10.

Referring to FIGURES 12 and 13, there are illustrated several ways in which turbulence may be induced in the space "h" between the moving surface 10 and the fixed surface 20. In FIGURE 12 a small jet blast 170 is provided at the upstream end 20U of the fixed surface, and is directed so as to blow a blast of air into the space "h" between the fixed surface 20 and the moving surface 10. This jet blast, 171 will produce a high velocity in the region of the blast. Thus, assuming that the moving surface is moving a velocity $Vp=c$, the velocity of the air in the space "h" will be such velocity at the point 172, on the moving surface, and will decrease along a curve 173 until reaching a point at 174 where the jet blast 171 engages the air in the space "h." A jet blast being at a much higher velocity increases the velocity in the region 175 to a maximum at 176 and as one approaches the fixed surface 20, the velocity again drops down some amount as, for example, at 177. The jet blast thus in the area of the blast will produce a highly concentrated effect at 175 and induces turbulence, but this effect is soon dissipated into the surrounding portions of the air in the space "h". At a location such as at 180 the turbulence induced by the jet blast will have increased throughout a goodly portion of the space "h," as in the portion denoted by the bracket 181 and further downstream, in the direction of motion of the moving surface, denoted by arrow 182, the turbulence induced by the jet blast will have spread to substantially all of the space "h" between the moving surface 10 and the fixed surface 20 as denoted by the bracket 182. Thus, the use of the jet blast as at 170, produces a condition of turbulence for a shorter total distance L for the mounting of the fixed surface 20, than would otherwise occur if no turbulence inducing device was included.

In FIGURE 13, the arrangement of parts is precisely the same as in FIGURE 12 except that the jet blast 185 is mounted more adjacent the fixed surface. In such case, the area of turbulence at 186 will gradually spread at 187, and at 188 at successive stages downstream, until it completely envelopes the space "h" between the two plates, as at 189. Any mechanical stirrer, as for example, a fan or a jet blast, will serve to induce turbulence, which once induced, will readily sustain itself due to the velocity of the moving surface relative to the fixed surface.

In situations where no turbulence inducing device is included, the length of the sensor housing in the direction of the motion of the moving surface will depend upon the velocity of that surface relative to the fixed surface. Normally, the length of the housing is more than ten times the spacing "h" between the fixed and moving surfaces, and may be as much as 50–70 times the length of the distance "h." Thus, in an exemplary form of the invention, the spacing "h" of the sensor mounting is two-tenths of an inch away from the moving surface and the length of the mounting plate 102 is from eight to twelve inches long, thus having a ratio of 40–60 times the spacing "h." It is not objectionable to use a longer mounting plate than needed.

In utilizing the invention, the confined space adjacent the moving surface should be sufficiently long so that a condition of uniform turbulence is developed therein, and the sensors 120 and 121 should be located at or near the downstream end of the mounting, relative to the direction of motion of the moving surface.

The condition of turbulence between the moving surface and the fixed surface depends upon the velocity of the moving surface, the amount of spacing "h" between the moving surface and the fixed surface, whether the moving surface moves downwardly or upwardly, and whether the moving surface temperature is higher or lower than the temperature of the fixed surface. The condition of turbulence will also be influenced by the use of turbulence inducing devices such as a jet blast, fan, etc. Where a jet blast is used for inducing the turbulence, the temperature of the gaseous fluid in the jet should be maintained as near as possible at the temperature of the moving surface. This may be accomplished by, for example, heating the air before or after compressing it for use in the jet, and maintaining the temperature thereof at or close to the temperature of the moving surface, as sensed by the lead-out instruments. In this way, the jet blast does not materially effect the temperature condition in the turbulent zone between the fixed surface and the moving surface, and the effect of the jet blast is therefore only in respect to inducing turbulence.

Figure 15:
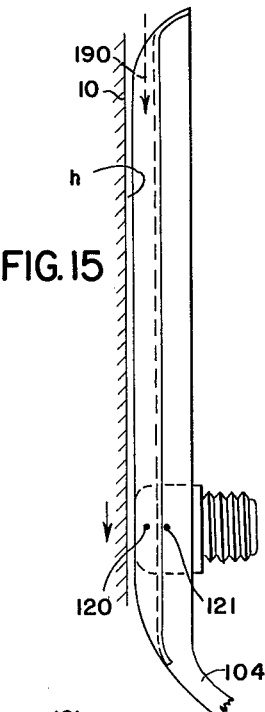
FIGURE 15 is a schematic side elevational view showing the invention as applied to a vertically moving surface which is moving downward.
Figure 14:
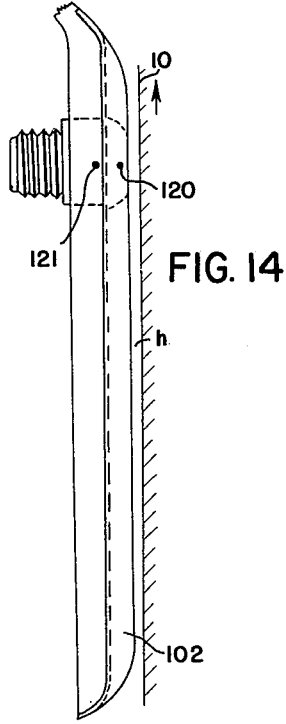
FIGURE 14 is a schematic side elevational view showing the invention as applied to a vertically moving surface which moves upward.

In FIGURES 14 and 15 there are illustrated the conditions of the use of the invention when the moving surface 10 is moving in a vertical direction upwardly as in FIGURE 14 and in a vertical direction downwardly as in FIGURE 15. When moving upwardly, as in FIGURE 14, such as for example in some of the manufacturing processes for sheet metal, the updraft between the sensor mounting 102 and the moving surface 10 is helpful in inducing turbulence in the space "h" between them. However, when the moving surface 10 is moving downwardly, the updraft effect in space "h" is counter-current to the effect produced by the moving strip 10, and in some instances it is therefore desirable to provide a jet blast downwardly in the direction of the arrow 190 at the upper portion or entrance of the space "h" between the moving surface 10 and the mounting 102. This jet blast is helpful in inducing the turbulence. This is not to suggest that the jet blast is essential for carrying out the invention, because it is not. It is used as an aid to the inducing of turbulence. In many instances, the jet blast is not needed, and in many instances the use of a jet blast can be avoided by extending the length of the mounting 102, so that the motion of the moving surface, in itself, induces the necessary turbulence. Where the moving surface moves very slowly, or stops for certain periods, the use of the jet blast is useful since it will insure maintenance of turbulence.

Figure 16:
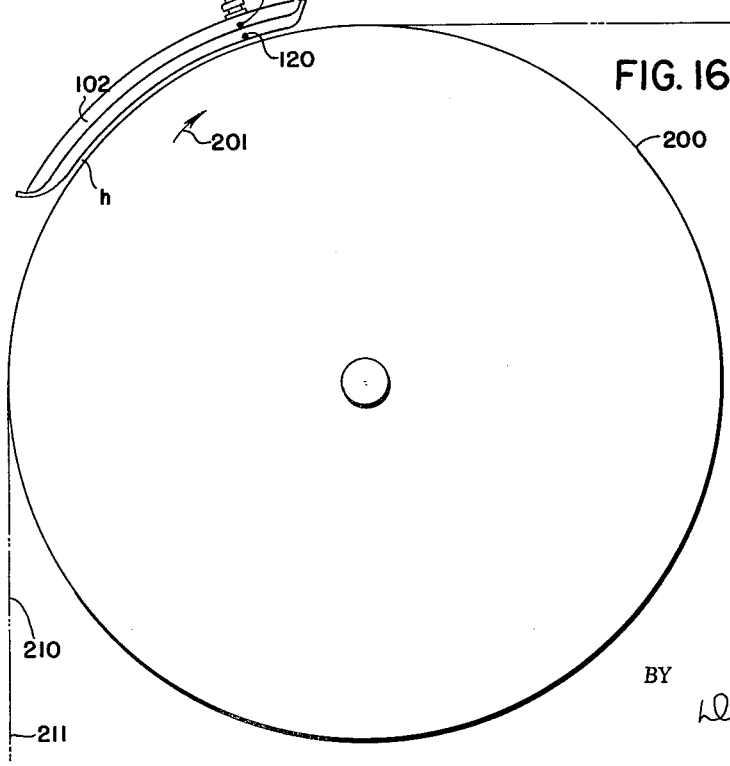
FIGURE 16 is a side elevational view showing the invention applied to a moving surface such as a body of revolution.

In FIGURE 16 there is illustrated application of the invention to measuring the temperature of the moving surface, as for example, the wheel 200, the rim of which is measured. In this instance, the temperature sensor 102 is curved so as to prevent a space "h" of uniform dimension between the under surface of the sensor mounting and the periphery of the wheel 200. The wheel 200 moves in the direction of the arrow 201, and the sensor elements 120 and 121 are placed at the downstream end of the mounting 102. The velocity of the wheel at its periphery induces in the space "h" a condition of uniform turbulence, and temperature readings are made at a position on the underside of the mounting 102 and one-half way between that mounting surface and the periphery of the wheel, as previously described, and from these temperature readings, the temperature of the wheel can be accurately calculated or directly indicated. If desired, the movement of the sheet of material as at 210, may be measured as it passes over the wheel 200, thus the sheet 210 may pass along the path of movement 211 and thence a part of a turn around the wheel 200 and along the path 211, and in so doing the temperature thereof may be sensed as it passes along the wheel since such sheet then becomes the "moving surface," in the indicating situation.

Where the term "moving surface" is used, it is intended to include those situations wherein the surface is such that it can move at a velocity ranging from a low velocity, even zero velocity, up to very high velocity.

As many widely apparently different embodiments of this invention may be made without departing from the spirit and scope thereof, it is to be understood that we do not limit ourselves to the specific embodiment herein.

What we claim is:

1. A device for measuring the temperature of a surface which may move, comprising a stationary wall and means mounting said wall in respect to the surface so as to define with said surface an elongated space through which a gaseous fluid is adapted to move, the velocity of the moving surface when it moves and length of said space being such as to provide a fully developed flow in such space, a first temperature sensor on the stationary wall for measuring the temperature thereof and a second temperature sensor positioned in spaced relation between the wall and the surface for sensing the temperature in the space between said wall and surface.

2. The device specified in claim 1 further characterized in that the surface is a sheet which is moved along a predetermined path adjacent said stationary wall.

3. The device specified in claim 1 further characterized in that the stationary surface is in the form of a channel facing the moving surface.

4. The device specified in claim 1 further characterized in that the second temperature sensor is positioned at substantially the midway point between the surface and the stationary wall.

5. The device specified in claim 1 further characterized in that means is provided for regulating the distance between the stationary wall and the surface.

6. The device specified in claim 1 further characterized in that the stationary wall is resiliently mounted for movement away from the surface.

7. A device for measuring the temperature of the surface of material while it is being moved along a prescribed path of motion comprising a wall and means mounting the wall in a position generally paralleling the path of motion of the surface, so as with the surface to form an elongated space through which gaseous fluid may move, the wall being sufficiently long in the direction of movement of the surface while it moves so that with the speed and direction of movement of the strip and under its conditions of operation the fluid between the surface and the wall will be brought to a condition of fully developed flow before reaching the end of the space, a first temperature sensor on the wall for sensing its temperature, a second temperature sensor in the fluid where its flow is fully developed and an indicator connected to said sensors and responsive to the signals generated thereby.

8. The device of claim 7 further characterized in that the second sensor is positioned approximately midway between the wall and the strip.

9. The device of claim 7 further characterized in that means is provided for maintaining the wall at a temperature near that of the strip.

10. The device of claim 7 further characterized in that the strip moves along a straight path of travel.

11. The device of claim 7 further characterized in that the strip moves downwardly.

12. The device of claim 7 further characterized in that the strip moves upwardly.

13. The device of claim 7 further characterized in that the strip moves around a curve.

14. The device of claim 7 further characterized in that means is provided for inducing turbulence in the fluid in the space between the surface and the strip.

No references cited.